(12) United States Patent
Yanagisawa

(10) Patent No.: US 10,455,145 B2
(45) Date of Patent: Oct. 22, 2019

(54) CONTROL APPARATUS AND CONTROL METHOD

(71) Applicant: CANON KABUSHIKI KAISHA, Tokyo (JP)

(72) Inventor: Takafumi Yanagisawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/935,354

(22) Filed: Mar. 26, 2018

(65) Prior Publication Data

US 2018/0295277 A1 Oct. 11, 2018

(30) Foreign Application Priority Data

Apr. 5, 2017 (JP) .................................. 2017-075448

(51) Int. Cl.
| | |
|---|---|
| *H04N 5/225* | (2006.01) |
| *H04N 5/232* | (2006.01) |
| *G06K 9/00* | (2006.01) |
| *H04N 7/18* | (2006.01) |

(52) U.S. Cl.
CPC ..... *H04N 5/23216* (2013.01); *G06K 9/00744* (2013.01); *H04N 5/225* (2013.01); *H04N 5/23206* (2013.01); *H04N 5/23299* (2018.08); *H04N 7/18* (2013.01)

(58) Field of Classification Search
CPC .... H04N 5/225; H04N 5/232; H04N 5/23216; H04N 5/23206; H04N 7/18; G06K 9/00; G06K 9/00744

USPC .......................... 348/169, 143, 211.8, 211.3
See application file for complete search history.

(56) References Cited

U.S. PATENT DOCUMENTS

| | | | | |
|---|---|---|---|---|
| 6,727,940 B1 * | 4/2004 | Oka | ..................... | H04N 5/2259 348/211.3 |
| 7,106,364 B1 * | 9/2006 | Noro | ...................... | H04N 7/181 348/211.3 |
| 7,450,840 B2 * | 11/2008 | Ohnishi | ............. | G08B 13/1968 348/211.13 |
| 7,956,891 B2 * | 6/2011 | Uchihara | ............... | H04N 5/232 348/143 |
| 8,312,133 B2 * | 11/2012 | Kurosawa | .......... | H04N 7/17318 348/143 |
| 8,429,703 B2 * | 4/2013 | Kurosawa | ........ | G08B 13/19682 348/143 |
| 8,817,119 B2 | 8/2014 | Ezoe et al. | | |
| 9,065,986 B2 * | 6/2015 | Mizutani | .......... | G08B 13/19682 |
| 2008/0106597 A1 * | 5/2008 | Amini | ................... | H04N 7/181 348/143 |

FOREIGN PATENT DOCUMENTS

| | | |
|---|---|---|
| JP | 2004157869 A | 6/2004 |
| JP | 2012034150 A | 2/2012 |

* cited by examiner

*Primary Examiner* — Trang U Tran
(74) *Attorney, Agent, or Firm* — Rossi, Kimms & McDowell LLP

(57) ABSTRACT

A control apparatus performs control so as to display an image shot by a camera on a display unit and moves an image capturing direction of the camera in a direction corresponding to an edge of the image if a region which is designated in the image displayed on the display unit is moved to a position corresponding to the edge and satisfies a predetermined condition.

3 Claims, 12 Drawing Sheets

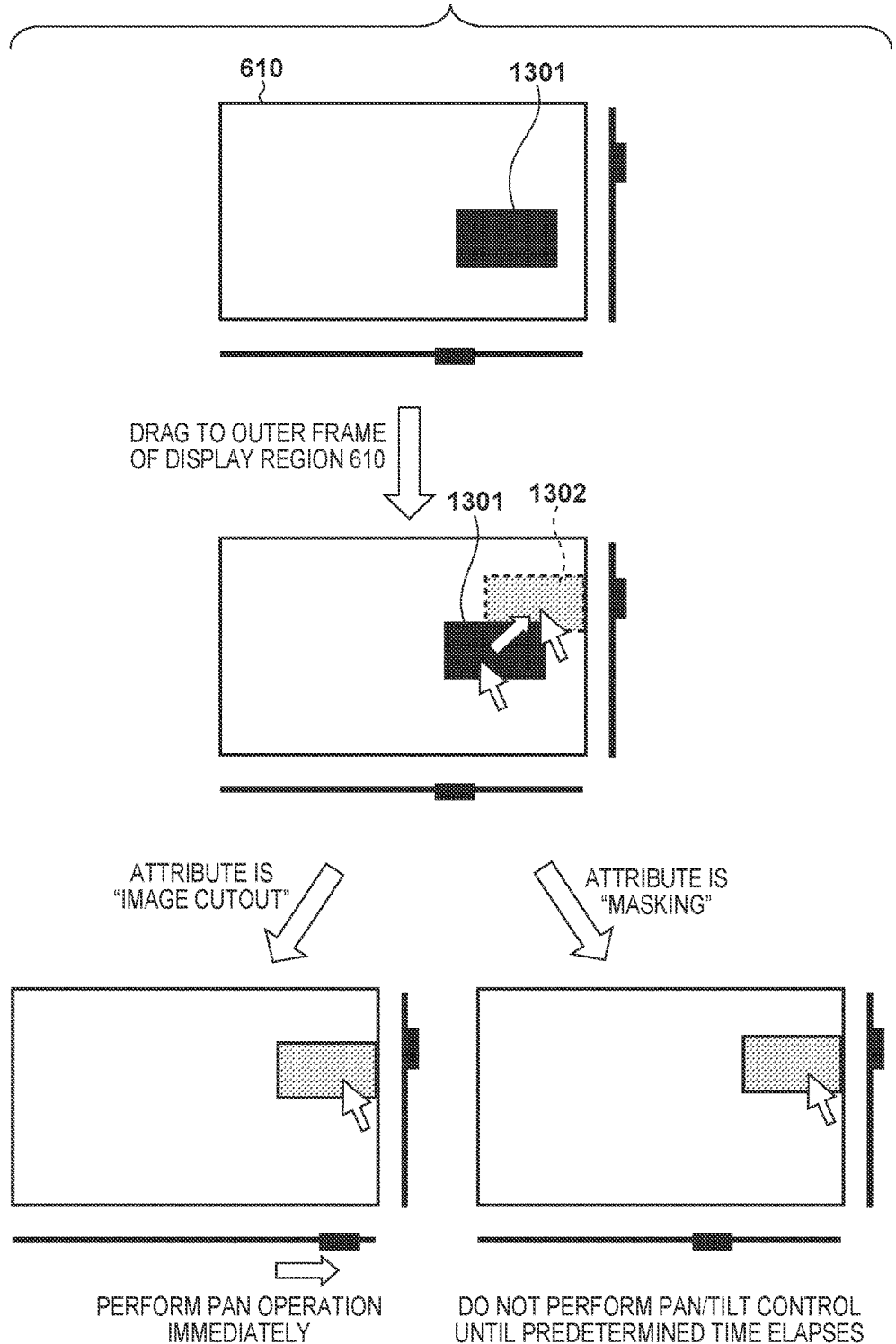

CONTROL APPARATUS AND CONTROL METHOD

BACKGROUND OF THE INVENTION

Field of the Invention

The present invention relates to a control apparatus and a control method.

Description of the Related Art

In recent years, a network camera connected to a network and performing an image capturing operation is finding increasing use. A client apparatus connected to the network camera displays an image obtained by the network camera on a display unit. A user can perform masking processing on a part of the image displayed on the display unit for privacy protection or another purpose.

Conventionally, in order to set a mask region (a region where the masking processing is performed), the user needs to take the following steps. That is, (1) a step of controlling pan/tilt of the network camera such that a region to be masked falls within a region displayable on the display unit, and (2) a step of setting the region to be masked are to be taken. However, the user needs to repeat the steps (1) and (2) again if he/she sets the mask region outside a range currently displayed on the display unit after the step (2), complicating an operation. As a technique having similar steps to these steps, Japanese Patent Laid-Open No. 2004-157869 discloses a technique of performing an operation on a predetermined region and pan/tilt control simultaneously.

As described above, taking the steps (1) and (2) in order to set the mask region results in the complicated operation. It is thus considered that pan/tilt of the network camera is controlled at time when the mask region set by the step (2) contacts the outer frame of a region displayable on a display unit of the client apparatus. However, if an arrangement is adopted in which pan/tilt of the network camera is controlled automatically at time when the mask region contacts the outer frame of the region displayable on the display unit of the client apparatus, it is impossible to set the mask region in the outer frame of the region displayable on the display unit. Such a problem may occur similarly in a region designated by the user where image processing is to be performed.

SUMMARY OF THE INVENTION

The present invention has been made in consideration of the above-described problems and provides, in this disclosure, a technique of setting a region in a display region in accordance with a user's intention.

As a method of achieving the above object, a control apparatus of the present invention has the following arrangement. That is, the control apparatus includes a display control unit configured to display an image shot by a camera on a display unit, and a control unit configured to perform control so as to move an image capturing direction of the camera in a direction corresponding to the edge of the image displayed on the display unit if a region designated in the image is moved to a position corresponding to the edge and satisfies a predetermined condition.

Further features of the present invention will become apparent from the following description of exemplary embodiments (with reference to the attached drawings).

BRIEF DESCRIPTION OF THE DRAWINGS

FIG. 13 shows views of a detailed example of a process according to the third embodiment.

DESCRIPTION OF THE EMBODIMENTS

The present invention will be described in detail below based on embodiments of the present invention with reference to the accompanying drawings. Note that arrangements to be described in the following embodiments are merely examples, and the present invention is not limited to the illustrated arrangements.

First Embodiment

Figure 1:
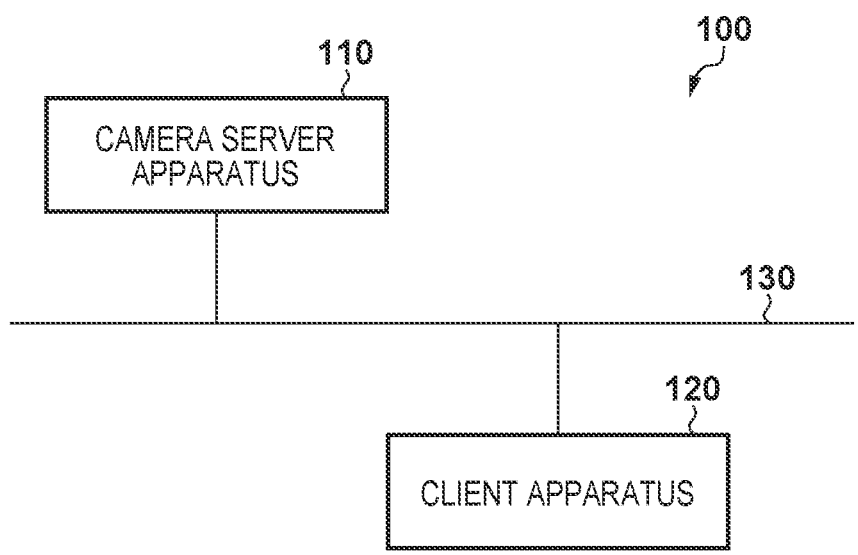
FIG. 1 is a block diagram showing an example of the arrangement of a network camera system according to an embodiment.

First, the first embodiment of the present invention will be described. FIG. 1 shows an example of the arrangement of a network camera system 100 according to this embodiment. As shown in FIG. 1, the network camera system 100 of this embodiment includes a camera server apparatus 110 and a client apparatus 120, and these apparatuses are connected via a network 130. Note that FIG. 1 shows one client apparatus 120 as a client apparatus connected to the camera server apparatus 110. However, the camera server apparatus 110 may be connected to a plurality of client apparatuses.

The camera server apparatus 110 includes a camera 231 (FIG. 2) and distributes image data which is generated from an image shot (captured) by the camera 231 via the network 130. The client apparatus 120 accesses the camera server apparatus 110 via the network 130 to receive image data and accumulates the received image data. The client apparatus 120 can perform necessary image processing on the image data and display an image on a display unit (FIG. 3) based on the image data that has undergone the image processing. The client apparatus 120 can also change a camera setting (pan/tilt or the like) of the camera server apparatus.

The network 130 is formed from, for example, a plurality of routers, switches, cables, and the like that satisfy a communication standard such as Ethernet®, and connects the camera server apparatus 110 and the client apparatus 120 communicable via a wire or wirelessly. Note that the communication standard, scale, and configuration of the network 130 are not particularly limited as long as it allows the camera server apparatus 110 and the client apparatus 120 to do communication without any problem. Hence, for example, the Internet and a LAN (Local Area Network) are also applicable as the network 130.

Figure 2:
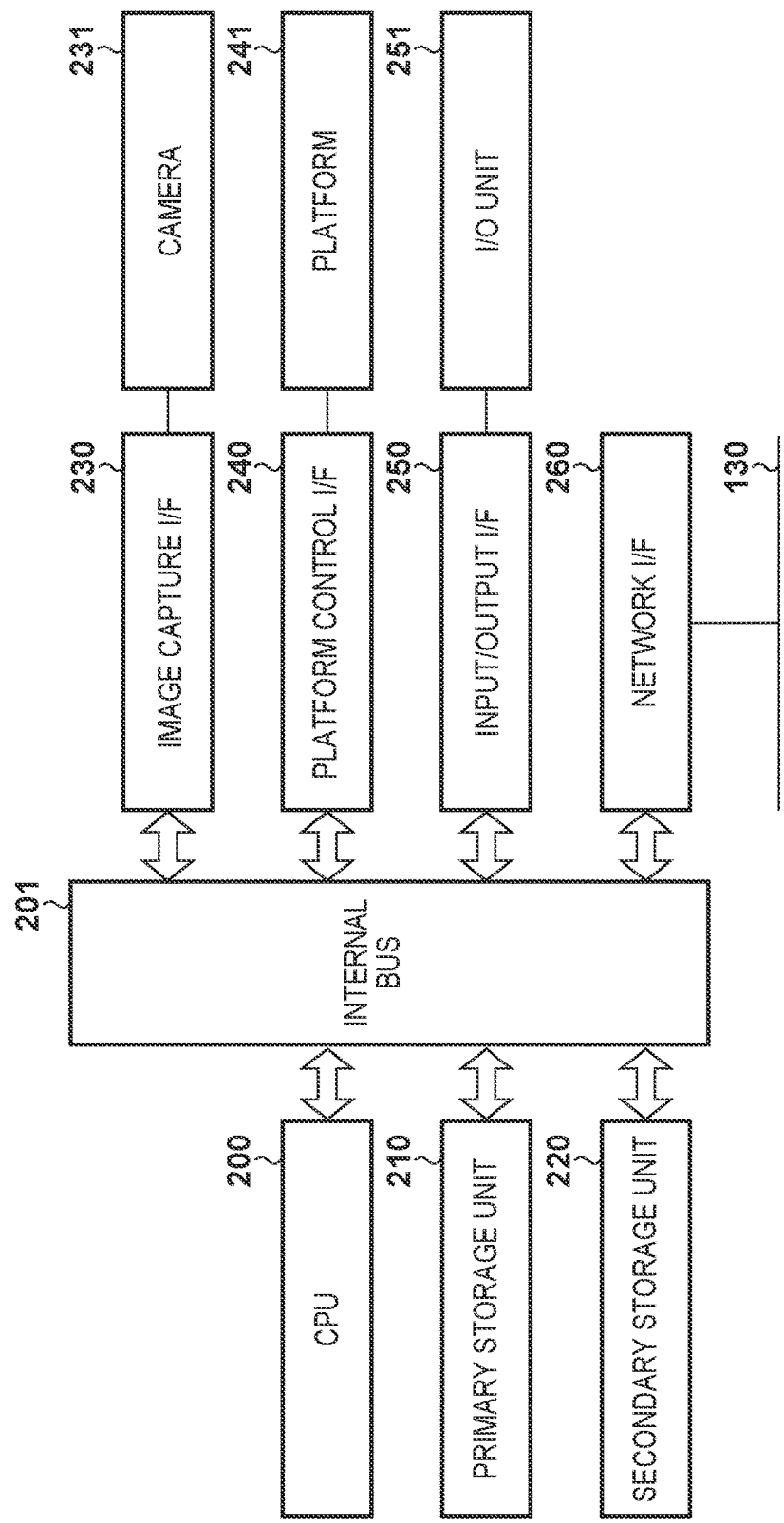
FIG. 2 is a block diagram showing an example of the hardware arrangement of a camera server apparatus 110.

The hardware arrangements of the camera server apparatus 110 and the client apparatus 120 will be described next. FIG. 2 is a block diagram showing an example of the hardware arrangement of the camera server apparatus 110. The camera server apparatus 110 includes, as the hardware arrangement, a CPU (Central Processing Unit) 200, a primary storage unit 210, a secondary storage unit 220, and various kinds of interfaces (an image capture I/F 230, a platform control I/F 240, an input/output I/F 250, and a network I/F 260) connected to an internal bus 201. The camera server apparatus 110 further includes the camera 231 connected to the image capture I/F 230, a platform 241 connected to the platform control I/F 240, and an input/output unit (I/O unit) 251 connected to the input/output I/F 250.

The CPU 200 generally controls the operation of the camera server apparatus 110. The primary storage device 210 is a high-speed writable storage device represented by, for example, a RAM (Read Only Memory). The primary storage unit 210 stores, for example, an OS (Operating System), various kinds of programs, various kinds of data, and the like. The primary storage device 210 is also used as a work area when the CPU 200 executes the OS, the various kinds of programs, and the like. The secondary storage device 220 is a nonvolatile storage device represented by, for example, an FDD (Floppy Disc Drive) or HDD (Hard Disc Drive), a flash memory, a CD-ROM drive, or the like. The secondary storage device 220 is used as a permanent storage area for the OS, various kinds of programs, various kinds of data, and the like and is also used as a short-term storage area for various kinds of data and the like.

The camera 231 is an imaging (image capturing) apparatus and can be configured to be able to change the imaging field angle or the zoom position. When image capturing (capture) ends, the camera 231 can issue an event (image capture end event) indicating that image capture ends. Note that this event can take any form such as a signal. The image capture I/F 230 converts/compresses the image data of an image shot (captured) by the connected camera 231 into a predetermined format and transfers it to the secondary storage device 220 or the primary storage unit 210.

The platform 241 is a movable device capable of mounting the camera 231 and fixing the camera 231 in an arbitrary direction. The platform control I/F 240 controls the connected platform 241 upon receiving a command from the CPU 200. Consequently, the pan angle, tilt angle, or the like of the camera 231 is changed.

The I/O unit 251 is an input/output device formed from, for example, a keyboard and a mouse. The input/output I/F 250 accepts a signal/interruption from the outside or outputs a signal to the outside via the connected I/O unit 251. The network I/F 260 is an interface used to connect the network 130 and communicates with the client apparatus 120 via the network 130.

Figure 3:
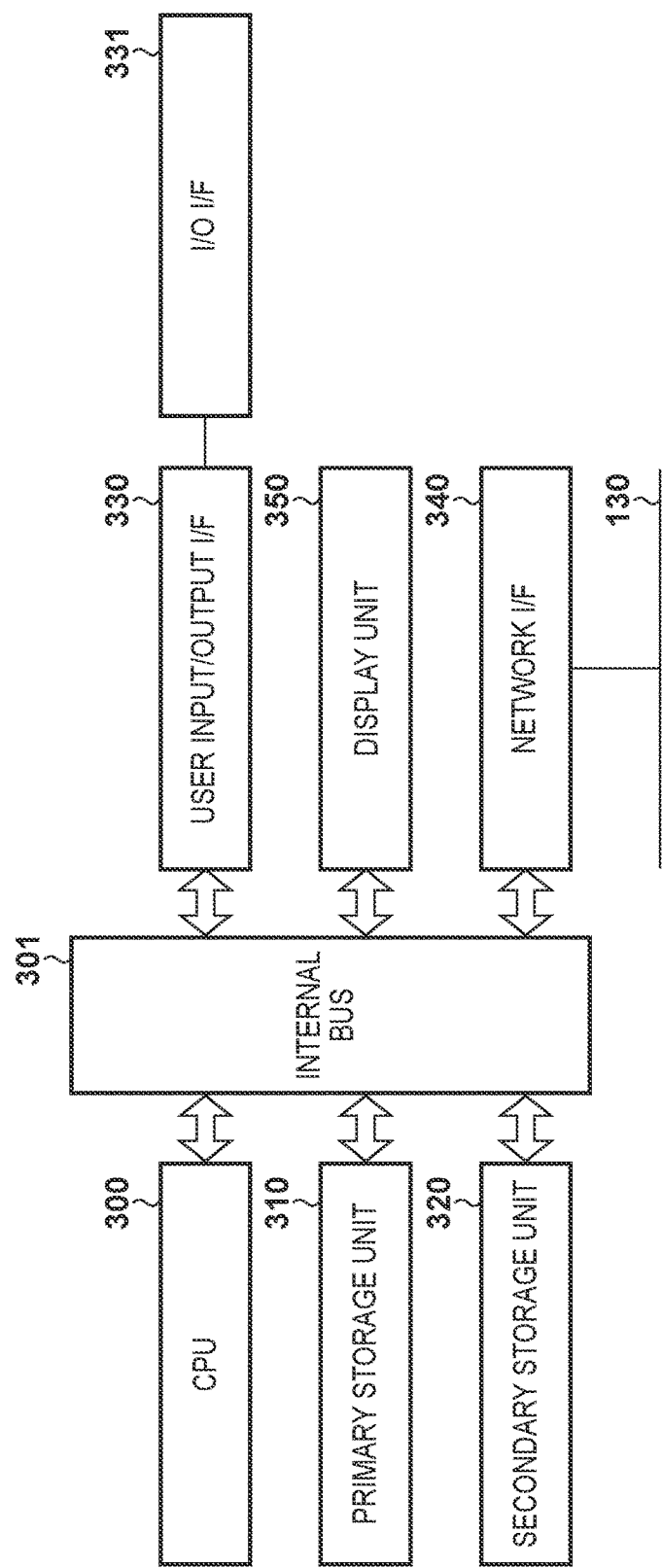
FIG. 3 is a block diagram showing an example of the hardware arrangement of a client apparatus 120.

FIG. 3 is a block diagram showing an example of the hardware arrangement of the client apparatus 120. The client apparatus 120 includes, as the hardware arrangement, a CPU 300, a primary storage unit 310, a secondary storage unit 320, a user input/output I/F 330, and a network I/F 340 connected to an internal bus 301. The client apparatus 120 further includes an input/output unit (I/O unit) 331 connected to the user input/output I/F 330.

The CPU 300 generally controls the operation of the client apparatus 120. The primary storage device 310 is a high-speed writable storage device represented by, for example, a RAM. This primary storage unit 310 stores, for example, an OS, various kinds of programs, various kinds of data, and the like. The primary storage device 310 is also used as a work area when the CPU 300 executes the OS, the various kinds of programs, and the like. The secondary storage device 320 is a nonvolatile storage device represented by, for example, an FDD or HDD, a flash memory, a CD-ROM drive, or the like. The secondary storage device 320 is used as a permanent storage area for the OS, various kinds of programs, various kinds of data, and the like and is also used as a short-term storage area for various kinds of data and the like.

The I/O unit 331 is an input/output device formed from, for example, a keyboard and a mouse. The user input/output I/F 330 controls input/output with the user via the connected I/O unit 331. The network I/F 340 is an interface used to connect the network 130 and communicates with the camera server apparatus 110 via the network 130. A display unit 350 is an image display apparatus such as a display that performs various kinds of display.

Figure 4:
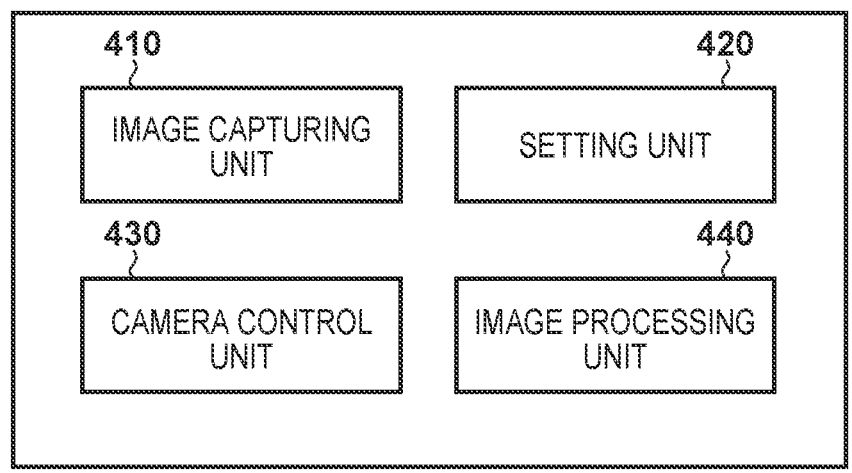
FIG. 4 is a block diagram showing an example of the functional arrangement of the camera server apparatus 110.

The functional arrangements of the camera server apparatus 110 and the client apparatus 120 will be described next. FIG. 4 is a block diagram showing an example of the functional arrangement of the camera server apparatus 110. The camera server apparatus 110 includes, as the functional arrangement, an image capturing control unit 410, a setting unit 420, a camera control unit 430, and an image processing unit 440.

The image capturing control unit 410 controls capturing of an image by the camera 231 and manages/distributes an image captured by the camera 231. For example, when the image capturing control unit 410 detects an image capture end event upon the end of image capture from the camera 231, it obtains the image captured by the camera 231 via the image capture I/F 230. Then, the image capturing control unit 410 converts/compresses obtained data into a predetermined format, generates image data, and stores and saves (accumulates) it in the secondary storage unit 220. Moreover, for example, when the image capturing control unit 410 detects an event (delivery request event) that requests delivery from the client apparatus 120 via the network 130, it delivers the image data saved in the secondary storage unit 220 to the client apparatus 120. In this way, in response to detection of a predetermined event, the image capturing control unit 410 performs processing from capturing of the image by the camera 231 of the camera server apparatus 110 to distribution of image data via the network 130 or the like. Note that such a predetermined event can take any form such as a signal.

The setting unit 420 receives, via the network I/F 260, the contents of a user operation input from the I/O unit 331 via the user input/output I/F 330 of the client apparatus 120. Then, in accordance with the contents of the user operation, the setting unit 420 sets a mask region (a region where masking processing is performed) and instructs the camera control unit 430 to move in a pan/tilt direction. Furthermore, the setting unit 420 stores and saves (accumulates), as setting data, information concerning the set mask region (a region where image processing is performed) in the secondary storage unit 220.

Based on the instruction to move in the pan/tilt direction from the setting unit 420, the camera control unit 430 controls the platform 241 via the platform control I/F 240. However, when pan/tilt control or the like is performed in a pseudo manner using a cut image obtained by cutting a part of image data, the camera control unit 430 may perform a process of changing a cut region for the instruction to move in the pan/tilt direction.

Based on the setting data set by the setting unit 420, the image processing unit 440 performs image processing such as the masking processing on the image data generated by the image capturing control unit 410 and generates processed image data. In this embodiment, the masking processing is given as an example of the type of image processing. However, the present invention is not limited to this. For example, a process of reducing an image data amount only in a set region, a cutting process of cutting an image in the set region, or the like may be given.

Note that the aforementioned image data and setting data need not always exist in the secondary storage unit 220 of the camera server apparatus 110, and they may exist in, for example, the secondary storage unit 320 of the client apparatus 120 as will be described later.

Figure 5:
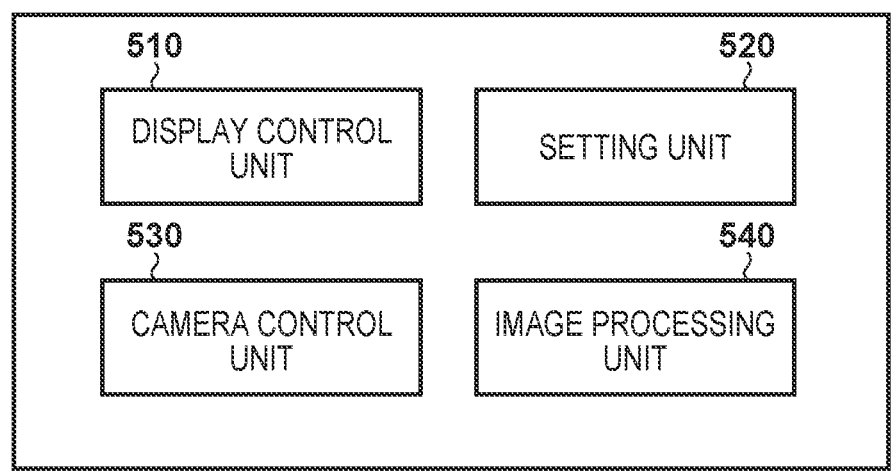
FIG. 5 is a block diagram showing an example of the functional arrangement of the client apparatus 120.

FIG. 5 is a block diagram showing an example of the functional arrangement of the client apparatus 120. The client apparatus 120 includes, as the functional arrangement, a display control unit 510, a setting unit 520, a camera control unit 530, and an image processing unit 540.

The display control unit 510 performs control to display the image data generated in the camera server apparatus 110 and the processed image data generated by the image processing unit 440 (and the image processing unit 540) on the display unit 350. In addition, the display control unit 510 may perform a process of displaying, on the display unit 350, UIs (User Interfaces) needed for control and setting for the camera 231 as the I/O unit 331 and the user input/output I/F 330. The user can make an event (delivery request event) that requests image delivery for the camera server apparatus 110 via such UIs.

The setting unit 520, the camera control unit 530, and the image processing unit 540 function in the same manner as the setting unit 420, the camera control unit 430, and the image processing unit 440 of the camera server apparatus 110 shown in FIG. 4.

Figure 6:
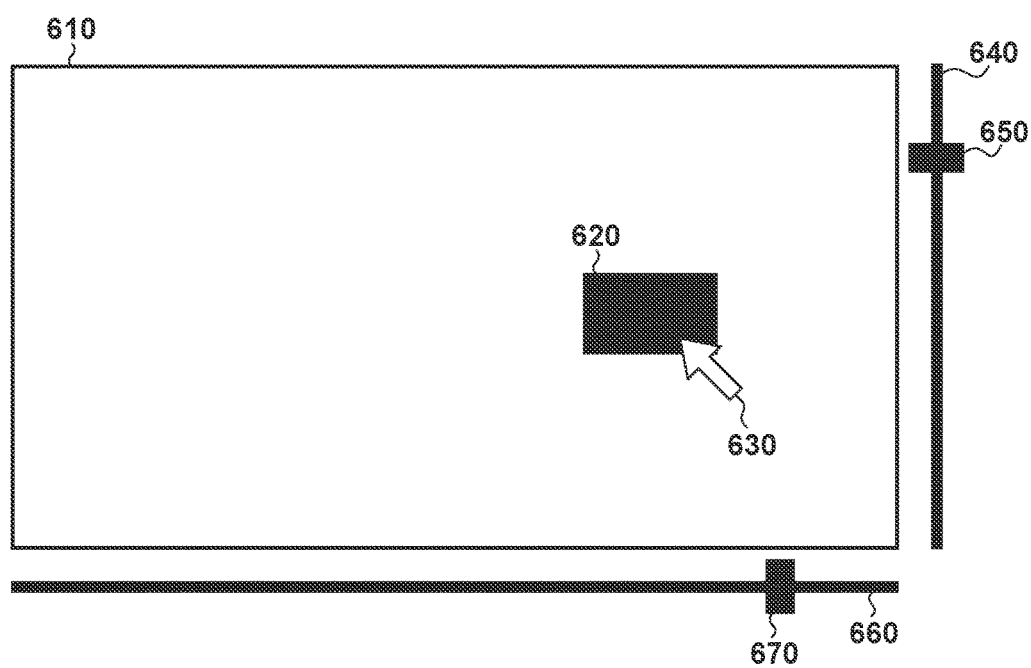
FIG. 6 is a view showing an example of a screen displayed on a display unit 350 according to the first embodiment.

FIG. 6 shows an example of a screen displayed on the display unit 350 by the display control unit 510 according to this embodiment. In FIG. 6, the processed image data generated by the image processing unit 440 of the camera server apparatus 110 or the image processing unit 540 of the client apparatus 120 is displayed on the display unit 350.

A display region 610 is displayed on the display unit 350. In this embodiment, the display region 610 is a rectangle but may have an arbitrary shape. Moreover, the display region 610 may occupy an entire region displayable by the display unit 350 or may occupy a part of the displayable region.

A setting region 620 is a rectangle for the user to set a region to be masked. In this embodiment, the setting region 620 is the rectangle but can also use an arbitrary shape such as a circle or a trapezoid. In accordance with the region to be masked, the user can change the size of the setting region 620 freely by using the I/O unit 331. The user can move the setting region 620 in the outer frame of the display region 610 by operating the I/O unit 331.

A cursor 630 is a graphic indicating coordinates currently operated by the user. The user can move the cursor 630 freely by using the I/O unit 331. Note that the cursor 630 may not be displayed on the display unit 350 formed from a tablet or the like.

A tilt slider 640, a tilt slider knob 650, a pan slider 660, and a pan slider knob 670 are controls for controlling pan of the camera and a tilt operation by using the I/O unit 331 by the user. The camera control unit 530 controls the platform 241 via the platform control I/F 240 and the CPU 200 in accordance with a click on the tilt slider 640 and the tilt slider knob 650 or performance of drag & drop operations on the tilt slider knob 650 and the pan slider knob 670 by the user. However, when a camera that does not need the platform 241 such as a camera that performs pan/tilt control or the like in a pseudo manner using a cut image obtained by cutting a part of image data is used as the camera 231, the user can perform a process of changing a cut region by operating the above-described controls.

Figure 7:
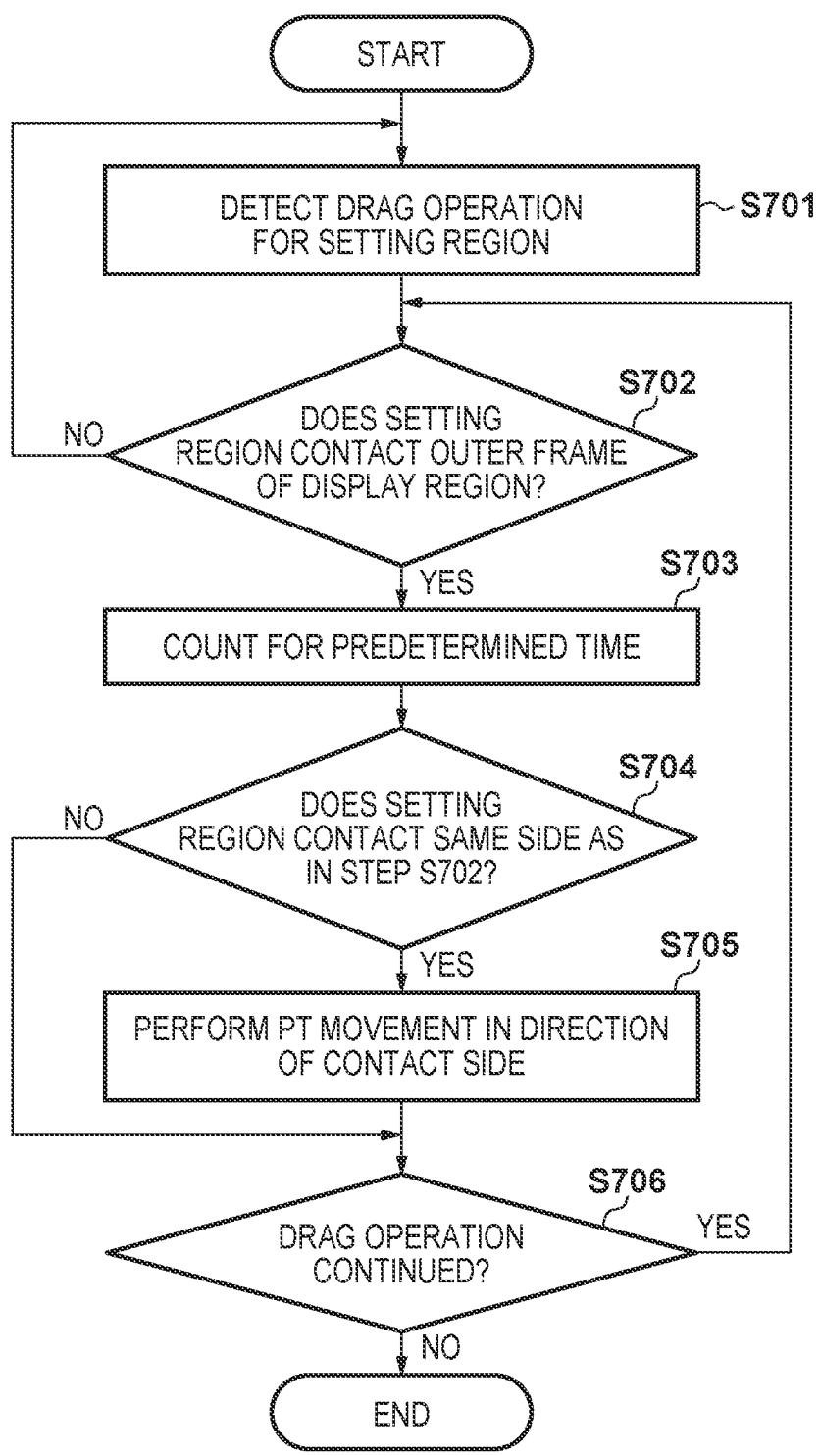
FIG. 7 is a flowchart showing an example of a processing procedure according to the first embodiment.

FIG. 7 is a flowchart showing an example of a processing procedure of the client apparatus 120 according to this embodiment. The flowchart shown in FIG. 7 is performed when, for example, the CPU 300 of the client apparatus 120 executes the programs stored in the primary storage device 310 shown in FIG. 5. Note that the screen as shown in FIG. 6 is displayed on the display unit 350 of the client apparatus 120 when a process shown in FIG. 7 is started. Furthermore, pan/tilt of the camera 231 is not controlled automatically if the setting region 620 contacts the outer frame of the display region 610 by a user operation.

In step S701, the setting unit 420 detects a drag operation for the setting region 620 (for example, by the cursor 630) input from the I/O unit 331 via the user input/output I/F 330 by the user.

In step S702, the setting unit 420 determines whether the setting region 620 moves to a position corresponding to the edge of the display region 610. For example, the setting unit 420 determines whether the setting region 620 contacts the outer frame of the display region 610. If the setting region 620 contacts the outer frame of the display region 610 (YES in step S702), the process advances to step S703. If the setting region 620 does not contact the outer frame of the display region 610 (NO in step S702), the process returns to step S701.

In step S703, the setting unit 420 measures a time elapsed since the setting region 620 contacts the outer frame of the display region 610 for a predetermined time. Subsequently, the process advances to step S704. Note that the predetermined time may be, for example, an arbitrary time decided by the user or a time decided in advance as the setting of the camera 231.

In step S704, the setting unit 420 determines whether the setting region 620 contacts the same side as the outer frame of the display region 610 that the setting region 620 has contacted at the time of the process in step S702. If the setting region 620 contacts the same side as the outer frame of the display region 610 that the setting region 620 has contacted at the time of the process in step S702 (YES in step S704), the process advances to step S705. If the setting region 620 does not contact the same side (NO in step S704), the process advances to step S706.

In step S705, the setting unit 420 performs control so as to move an image capturing direction of the camera 231 in a direction corresponding to the edge of the display region 610. For example, the setting unit 420 instructs the camera control unit 430 to perform pan/tilt control in a direction in which the setting region 620 contacts. Note that a moving amount for the pan/tilt control may be a fixed value set in the camera 231 in advance or a dynamically changing value such as movement only by half the size of the setting region 620. In accordance with this, the camera control unit 530 controls the platform 241 via the platform control I/F 240.

However, when the pan/tilt control or the like is performed in the pseudo manner using the cut image obtained by cutting the part of the image data, the camera control unit 430 may perform the process of changing the cut region for the instruction to move in the pan/tilt direction.

Then, in step S706, the setting unit 420 determines whether the drag operation by the user is continued for the setting region 620. If the drag operation is continued (YES in step S706), the process returns to step S702. If the drag operation is not continued (NO in step S706), this process ends.

Figure 8:
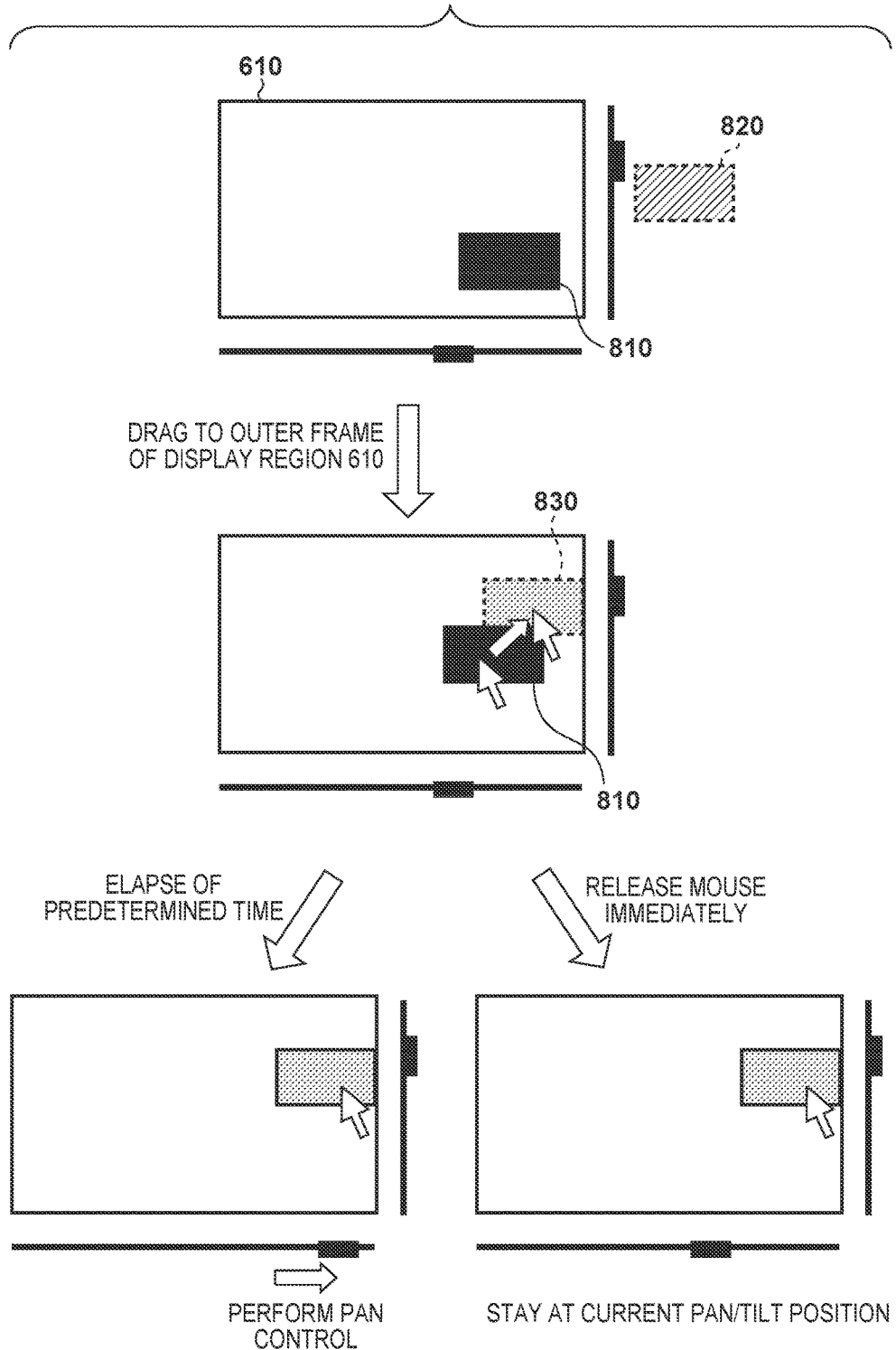
FIG. 8 shows views of a detailed example of a process according to the first embodiment.

The process of the flowchart in FIG. 7 will be described by using a detailed example shown in FIG. 8. FIG. 8 shows views of the detailed example of the process according to this embodiment.

When the user changes the position of a setting region 810 to a target setting region 820, the user moves the setting region 810 by using the I/O unit 331. Then, with this moving operation, the position of the setting region 810 becomes the position of a setting region 830 and contacts the outer frame of the display region 610 (YES in step S702). At this time, if the predetermined time has elapsed in a state in which the position of the setting region 830 contacts the outer frame of the display region 610 by a user operation (YES in step S704), the pan control of the camera 231 is performed (step S705) as shown in the lower left portion of FIG. 8. On the other hand, for example, if the user releases the mouse serving as the I/O unit 331 immediately without the elapse of a predetermined time since the setting region 830 contacts the outer frame of the display region 610 (NO in step S704), the pan control of the camera 231 is not performed, and the camera 231 stays at a current pan/tilt position as shown in the lower right portion of FIG. 8. Then, the process in FIG. 7 is performed continuously while the drag operation is continued.

As described above, according to this embodiment, if the user wants to set the setting region 620 at a position outside the display region 610, this can be done only by one drag operation. If the drag operation is not continued for a predetermined time since the setting region 620 contacts the outer frame of the display region 610, it becomes possible to set the setting region 620 at a position contacting the outer frame of the display region 610. Accordingly, user operability improves as compared with a conventional operation procedure. Note that an example in which the pan/tilt control is performed based on the drag operation by the user has been described above. Instead of this, however, the pan/tilt control may be performed based on another operation capable of designating the position of the setting region 620 continuously.

Second Embodiment

An example in which pan/tilt control of a camera is performed on a condition different from a condition described in the first embodiment in a network camera system will be described next as the second embodiment. Note that the arrangement of the network camera system, and the arrangements of a camera server apparatus 110 and a client apparatus 120 are the same as in FIGS. 1 to 5 described in the first embodiment, and thus a description thereof will be omitted. In addition, a description of the same portions as in the first embodiment will be omitted.

Figure 9:
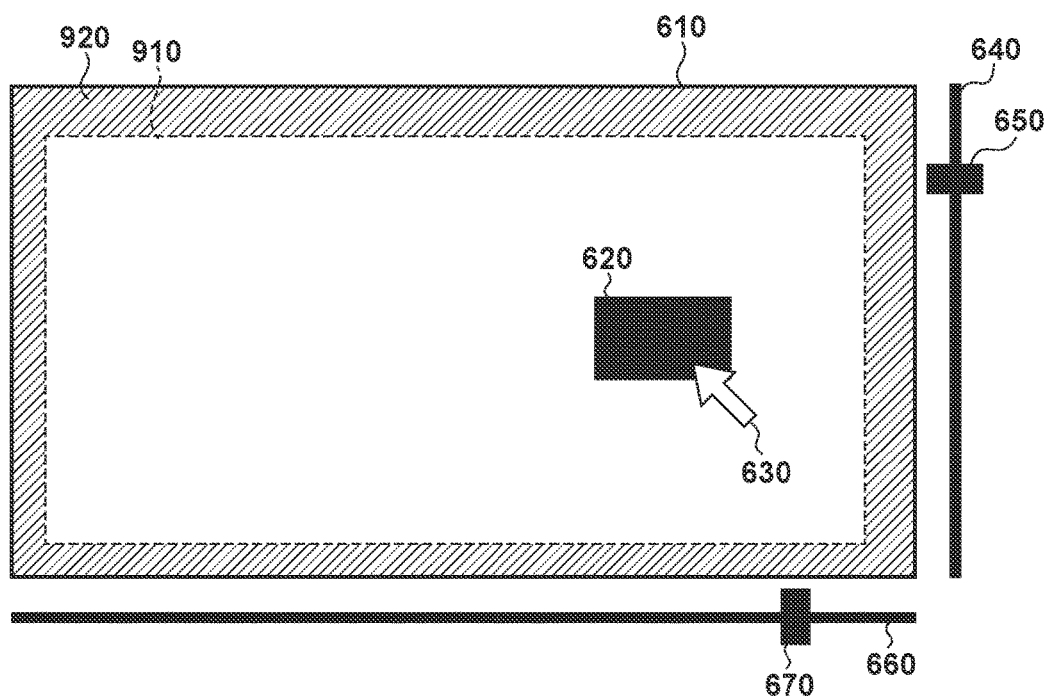
FIG. 9 is a view showing an example of a screen displayed on a display unit 350 according to the second embodiment.

FIG. 9 shows an example of a screen displayed on a display unit 350 by a display control unit 510 according to this embodiment. A pan/tilt control boundary line 910 is a line used to determine whether to perform pan/tilt control. The pan/tilt control boundary line 910 is set inside by a predetermined distance from the outer frame of a display region 610. Furthermore, the position/length of the pan/tilt control boundary line 910 may be a length set in a camera 231 in advance or may be changed dynamically in accordance with the size of a setting region 620.

A pan/tilt control region 920 is a region between the pan/tilt control boundary line 910 and the outer frame of the display region 610. That is, the pan/tilt control region 920 indicates a range surrounded by a predetermined distance from the sides of the outer frame of the display region 610. In this embodiment, the pan/tilt control is performed in a direction in which the setting region 620 contacts if the setting region 620 contacts the outer frame of the display region 610, and coordinates (for example, coordinates of a cursor 630) operated by a user are positioned in the pan/tilt control region 920.

Figure 10:
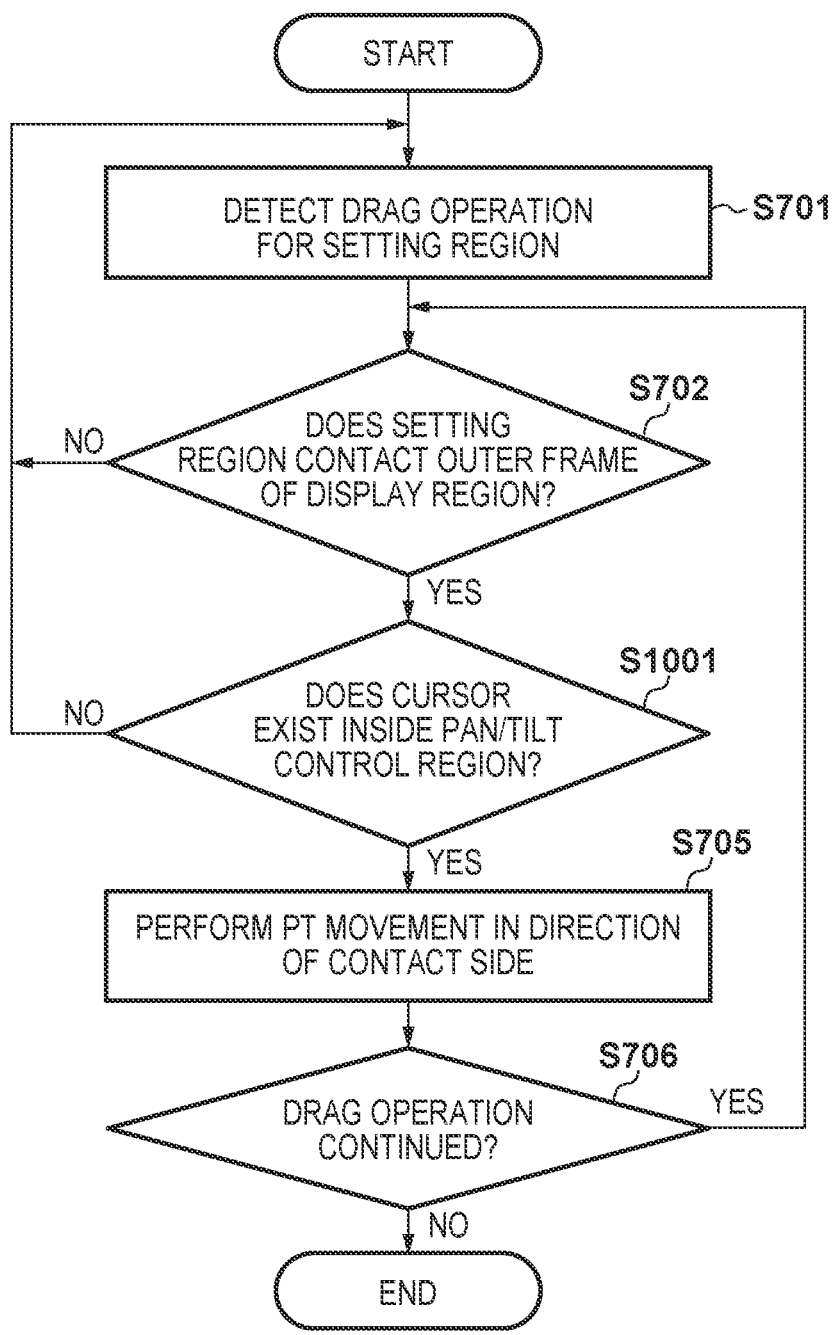
FIG. 10 is a flowchart showing an example of a processing procedure according to the second embodiment.

FIG. 10 is a flowchart showing an example of a processing procedure of the client apparatus 120 according to this embodiment. The flowchart shown in FIG. 10 is performed when, for example, a CPU 300 of the client apparatus 120 executes programs stored in a primary storage device 310 shown in FIG. 5. Note that the screen as shown in FIG. 9 is displayed on the display unit 350 of the client apparatus 120 when a process shown in FIG. 10 is started. Furthermore, pan/tilt of the camera 231 is not controlled automatically if the setting region 620 contacts the outer frame of the display region 610 by a user operation.

Processes in steps S701, S702, S705, and S706 are the same as in FIG. 7 described in the first embodiment, and thus a description thereof will be omitted.

In step S1001, a setting unit 420 determines whether the cursor 630 exists inside the pan/tilt control region 920. If the cursor 630 exists inside the pan/tilt control region 920 (YES in step S1001), the process advances to step S705 in which control is performed in an image capturing direction of the camera 231 regardless of the elapse of the predetermined time in step S703 of FIG. 7 described in the embodiment. On the other hand, if the cursor 630 exists outside the pan/tilt control region 920 (NO in step S1001), the process returns to step S701. Note that in step S1001, the setting unit 420 may determine whether the cursor 630 exists inside the pan/tilt control region 920 for a predetermined time or longer.

Figure 11:
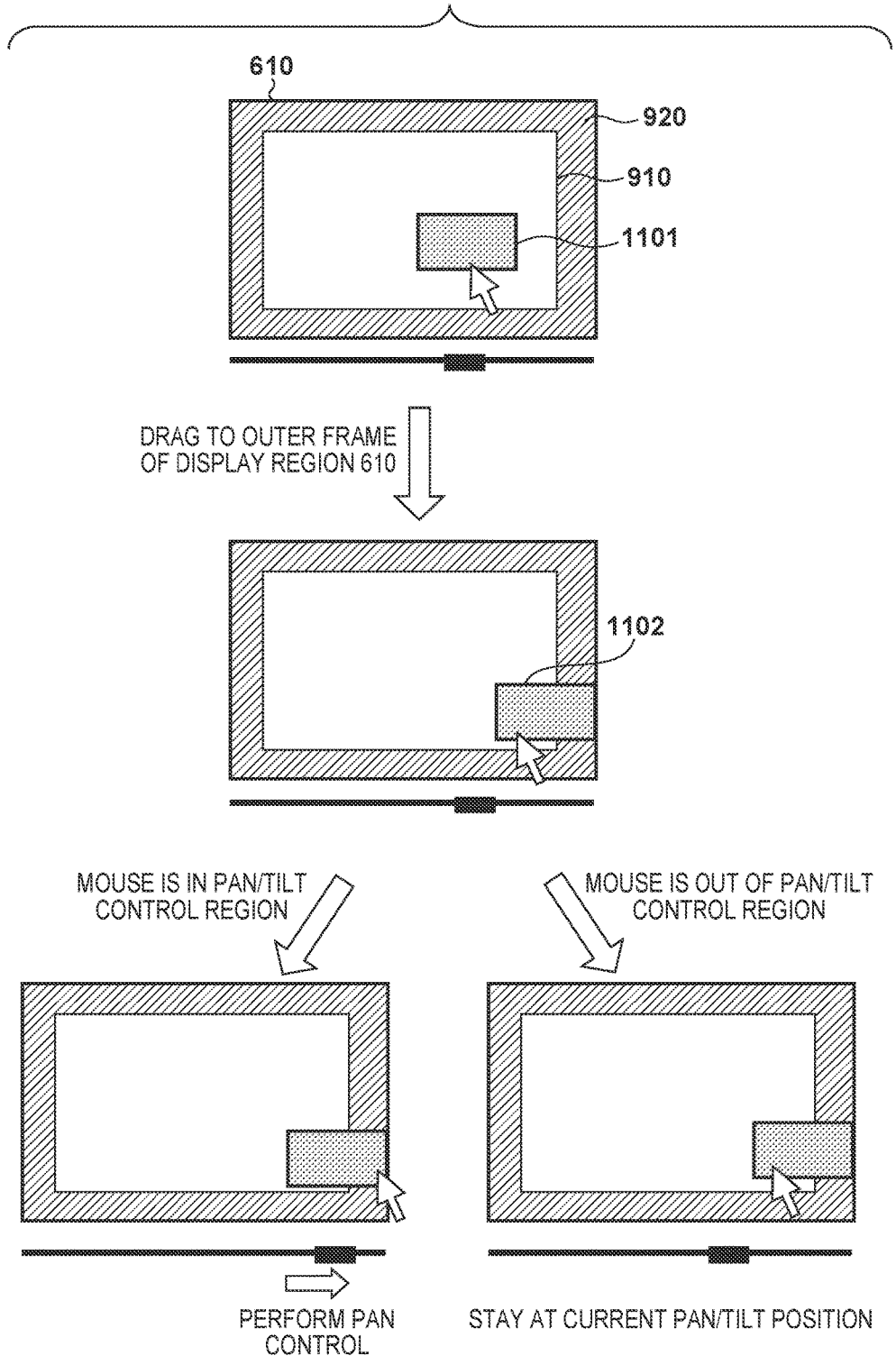
FIG. 11 shows views of a detailed example of a process according to the second embodiment.

The process of the flowchart in FIG. 10 will be described by using a detailed example shown in FIG. 11. FIG. 11 shows views of the detailed example of the process according to this embodiment.

If the user changes the position of a setting region 1101, the user moves the setting region 1101 by using an I/O unit 331. Then, with this moving operation, the position of the setting region 1101 becomes the position of a setting region 1102 and contacts the outer frame of the display region 610 (YES in step S702). At this time, if the cursor 630 exists inside the pan/tilt control region 920 by a user operation (YES in step S1001), pan control of the camera 231 is performed (step S705) as shown in the lower left portion of FIG. 11. On the other hand, if the cursor 630 exists outside the pan/tilt control region 920 (NO in step S1001), the pan control of the camera 231 is not performed, and the camera 231 stays at a current pan/tilt position as shown in the lower right portion of FIG. 11. The process in FIG. 11 is performed continuously while a drag operation is continued.

As described above, according to this embodiment, it becomes possible to perform the pan/tilt control without the user waiting in the state of the drag operation for a predetermined time, improving user operability. Note that the display unit 350 is formed from a tablet or the like, and thus if the cursor 630 is not displayed, internal coordinates or the like for a user operation may be used instead of the cursor 630.

Third Embodiment

An example in which a setting region 620 is associated with a plurality of types of attributes in a network camera system will be described next as the third embodiment. Note that the arrangement of the network camera system, and the arrangements of a camera server apparatus 110 and a client apparatus 120 are the same as in FIGS. 1 to 5 described in the first embodiment, and thus a description thereof will be omitted. In addition, a description of the same portions as in the first embodiment will be omitted.

Figure 12:
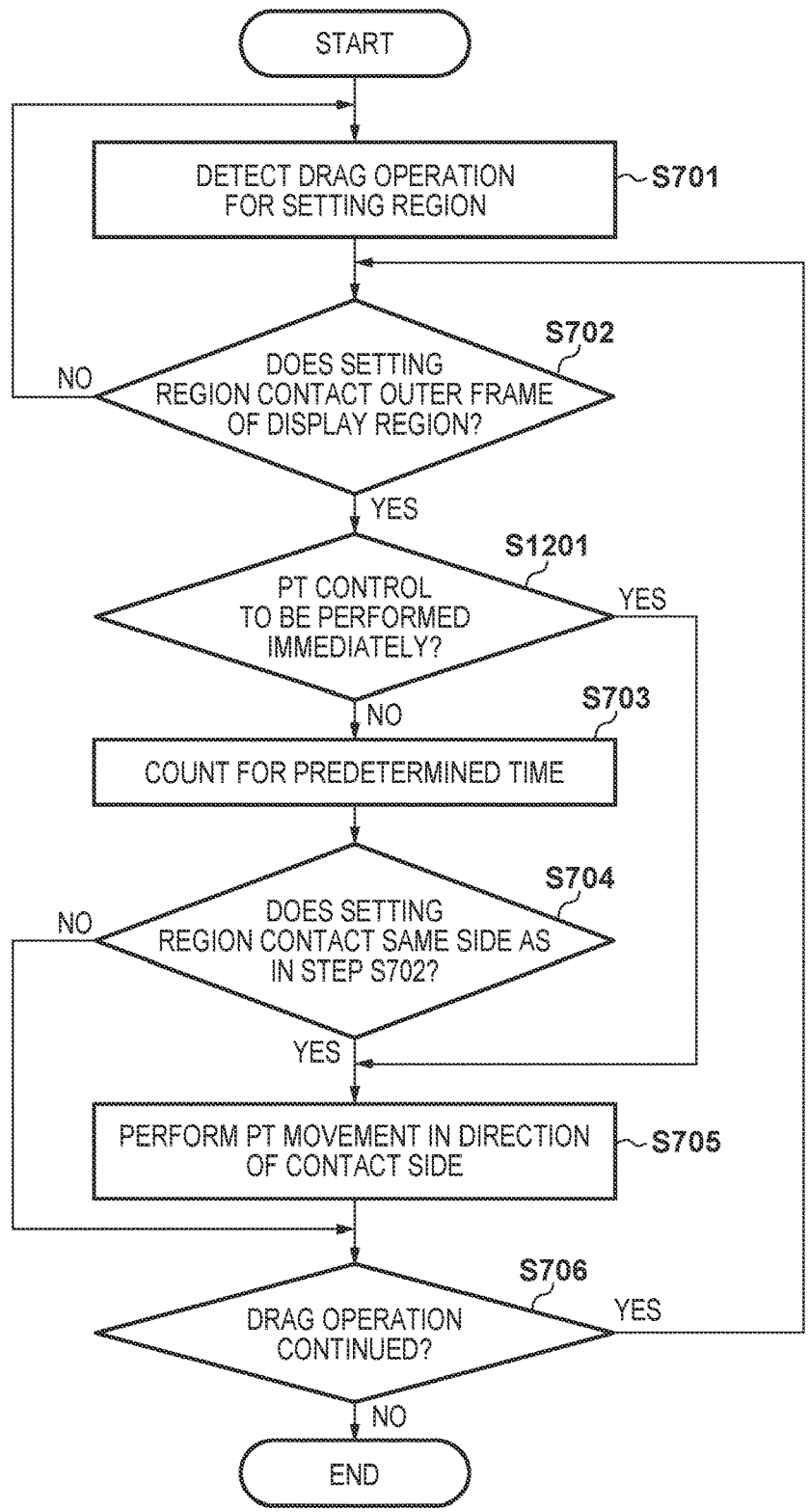
FIG. 12 is a flowchart showing an example of a processing procedure according to the third embodiment.

FIG. 12 is a flowchart showing an example of a processing procedure of the client apparatus 120 according to this embodiment. The flowchart shown in FIG. 12 is performed when, for example, a CPU 300 of the client apparatus 120 executes programs stored in a primary storage device 310 shown in FIG. 5.

Note that a screen as shown in FIG. 6 is displayed on a display unit 350 of the client apparatus 120 when a process shown in FIG. 12 is started. Furthermore, pan/tilt of a camera 231 is not controlled automatically if a setting region 620 contacts the outer frame of a display region 610 by a user operation.

In this embodiment, a process to be performed if the setting region 620 contacts the outer frame of the display region 610 is switched for each attribute associated with the setting region 620. Information concerning a processing setting to be performed if the setting region 620 contacts the outer frame of the display region 610 is set in advance as setting data by a setting unit 520 (or a setting unit 420) and saved in a secondary storage unit 320 (or a secondary storage unit 220).

In this embodiment, the attributes associated with the setting region 620 are "masking" and "image cutout". Then, if the attribute is "masking" (first type), pan/tilt is performed after the elapse of a predetermined time since the setting region 620 contacts the outer frame of the display region 610. If the attribute is "image cutout" (second type), the setting data is set so as to perform the pan/tilt control immediately after the setting region 620 contacts the outer frame of the display region 610.

Processes in steps S701 to S706 are the same as in FIG. 7 described in the first embodiment, and thus a description thereof will be omitted.

In step S1201, the setting unit 520 determines whether to perform the pan/tilt control immediately after the setting region 620 contacts the outer frame of the display region 610 from the attribute of the setting region 620 operated by a user using an I/O unit 331. The display region 610 is a region of the first type, and thus the process advances to step S705 if the setting unit 520 determines that the pan/tilt control should be performed immediately (YES in step S1201). On the other hand, the display region 610 is a region of the second type other than the region of the first type, and thus the process advances to step S703 if the setting unit 520 does not determine that the pan/tilt control should be performed immediately (NO in step S1201).

Note that when this embodiment is applied to the above-described second embodiment (FIG. 10), the process advances to step S1201 if the setting region 620 contacts the outer frame of the display region 610 in step S702, and the process returns to step S701 if the setting region 620 does not contact the outer frame of the display region 610 in step S702. Then, if the pan/tilt control is performed immediately after the setting region 620 contacts the outer frame of the display region 610 (for example, if the attribute of the setting region 620 is "masking") in step S1201 as described above, the process advances to step S705. On the other hand, if the pan/tilt control is not performed immediately after the setting region 620 contacts the outer frame of the display region 610 (for example, the attribute of the setting region 620 is "image cutout"), the process advances to step S703.

The flowchart of FIG. 12 will be described by using a detailed example shown in FIG. 13. FIG. 13 shows views of the detailed example of the process according to this embodiment.

If the user changes the position of a setting region 1301, the user moves the setting region 1301 by using the I/O unit 331. Then, with this moving operation, the position of the setting region 1301 becomes the position of a setting region 1302 and contacts the outer frame of the display region 610 (YES in step S702). At this time, if the attribute of the setting region 1301 is "image cutout" (YES in step S1201), pan control of the camera 231 is performed immediately (step S705) as shown in the lower left portion of FIG. 13. On the other hand, if the attribute of the setting region 1301 is "masking" (NO in step S1201), the pan control of the camera 231 is not performed, and the camera 231 stays at a current pan/tilt position as shown in the lower right portion of FIG. 13. The process in FIG. 13 is performed continuously while a drag operation is continued.

As described above, according to this embodiment, even if the setting region 620 to be set in contact with the outer frame of the display region 610 and the setting region 620 to be set not in contact with the outer frame of the display region 610 exist on the display region 610, user operability is improved by changing the control for each setting region. Note that an example in which the attributes are "image cutout" and "masking" has been described above. In addition, however, it is possible to set various attributes according to whether to perform the pan/tilt control immediately at time when the setting region 620 contacts the outer frame of the display region 610.

Thus, according to the above-described embodiment, the user can set a region where masking/image processing is to be performed without taking complicated steps by providing a condition on which the pan/tilt control is started in a state in which the region contacts the outer frame of the display region 610.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-075448, filed Apr. 5, 2017, which is hereby incorporated by reference herein in its entirety.

What is claimed is:

1. A control apparatus comprising:
a display control unit configured to display an image shot by a camera on a display unit:
an accepting unit configured to accept designation of a region in the image displayed on the display unit; and
a control unit configured to perform control so as to move an image capturing direction of the camera in a direction corresponding to an edge of the image if, after the region is moved to a position corresponding to the edge of the image in accordance with a user instruction and a predetermined time has elapsed since the region is moved to the position corresponding to the edge, the region exists at the position corresponding to the edge of the image, and
configured not to perform control so as to move the image capturing direction of the camera in the direction corresponding to the edge of the image if, after the region is moved to the position corresponding to the edge of the image and the predetermined time has elapsed since the region is moved to the position corresponding to the edge, the region does not exist at the position corresponding to the edge of the image.

2. The apparatus according to claim 1, wherein the position corresponding to the edge is a position contacting a side of an outer frame of the image.

3. A control method comprising:
accepting designation of a region in an image displayed on a display unit; and
performing control so as to move an image capturing direction of a camera in a direction corresponding to an edge of the image if the region is moved to a position corresponding to the edge of the image in accordance with a user instruction, and the region exists at the position corresponding to the edge of the image after a predetermined time has elapsed since the region is moved to the position corresponding to the edge, and not performing control so as to move the image capturing direction of the camera in the direction corresponding to the edge of the image if the region which is designated in the image displayed on the display unit is moved to the position corresponding to the edge of the image, and the region does not exist at the position corresponding to the edge of the image after the predetermined time has elapsed since the region is moved to the position corresponding to the edge.

* * * * *